(12) United States Patent
Chuang et al.

(10) Patent No.: US 10,305,278 B2
(45) Date of Patent: May 28, 2019

(54) VOLTAGE CONTROL SYSTEM

(71) Applicant: MSI COMPUTER (SHENZHEN) CO., LTD., Shenzhen, Guangdong Province (CN)

(72) Inventors: Chia-Sheng Chuang, Taipei (TW); Pei-Ching Kuo, New Taipei (TW); Wen-Chi Chen, Taipei (TW)

(73) Assignee: MSI COMPUTER (SHENZHEN) CO., LTD., Shenzhen (CN)

( * ) Notice: Subject to any disclaimer, the term of this patent is extended or adjusted under 35 U.S.C. 154(b) by 351 days.

(21) Appl. No.: 15/235,030

(22) Filed: Aug. 11, 2016

(65) Prior Publication Data

US 2017/0346298 A1 Nov. 30, 2017

(30) Foreign Application Priority Data

May 27, 2016 (TW) .............................. 105116765 A

(51) Int. Cl.
*H02J 4/00* (2006.01)
*H02J 1/10* (2006.01)
*G05F 5/00* (2006.01)
*G06F 1/26* (2006.01)

(52) U.S. Cl.
CPC ................ *H02J 1/102* (2013.01); *G05F 5/00* (2013.01); *G06F 1/26* (2013.01); *G06F 1/263* (2013.01)

(58) Field of Classification Search
CPC .... G05F 5/00; G06F 1/26; G06F 1/263; H02J 1/102
See application file for complete search history.

(56) References Cited

U.S. PATENT DOCUMENTS

2014/0035366 A1* 2/2014 Ganor ..................... H02M 3/04
307/18
2015/0244270 A1* 8/2015 Karlsson ........... H02M 3/33507
363/17

* cited by examiner

*Primary Examiner* — Jared Fureman
*Assistant Examiner* — Aqeel H Bukhari
(74) *Attorney, Agent, or Firm* — Maschoff Brennan

(57) ABSTRACT

A voltage control system includes a first voltage converter, a second voltage converter and a voltage monitoring module. The first voltage converter is coupled to a first power source and configured to convert first electrical energy of the first power source into a first output voltage. The second voltage converter is coupled to a second power source and configured to convert second electrical energy of the second power source into a second output voltage. The voltage monitoring module is coupled to the first voltage converter and the second voltage converter. The voltage monitoring module is configured to regulate the first output voltage or the second output voltage by controlling the first voltage converter and the second voltage converter according to the first output voltage and the second output voltage.

9 Claims, 1 Drawing Sheet

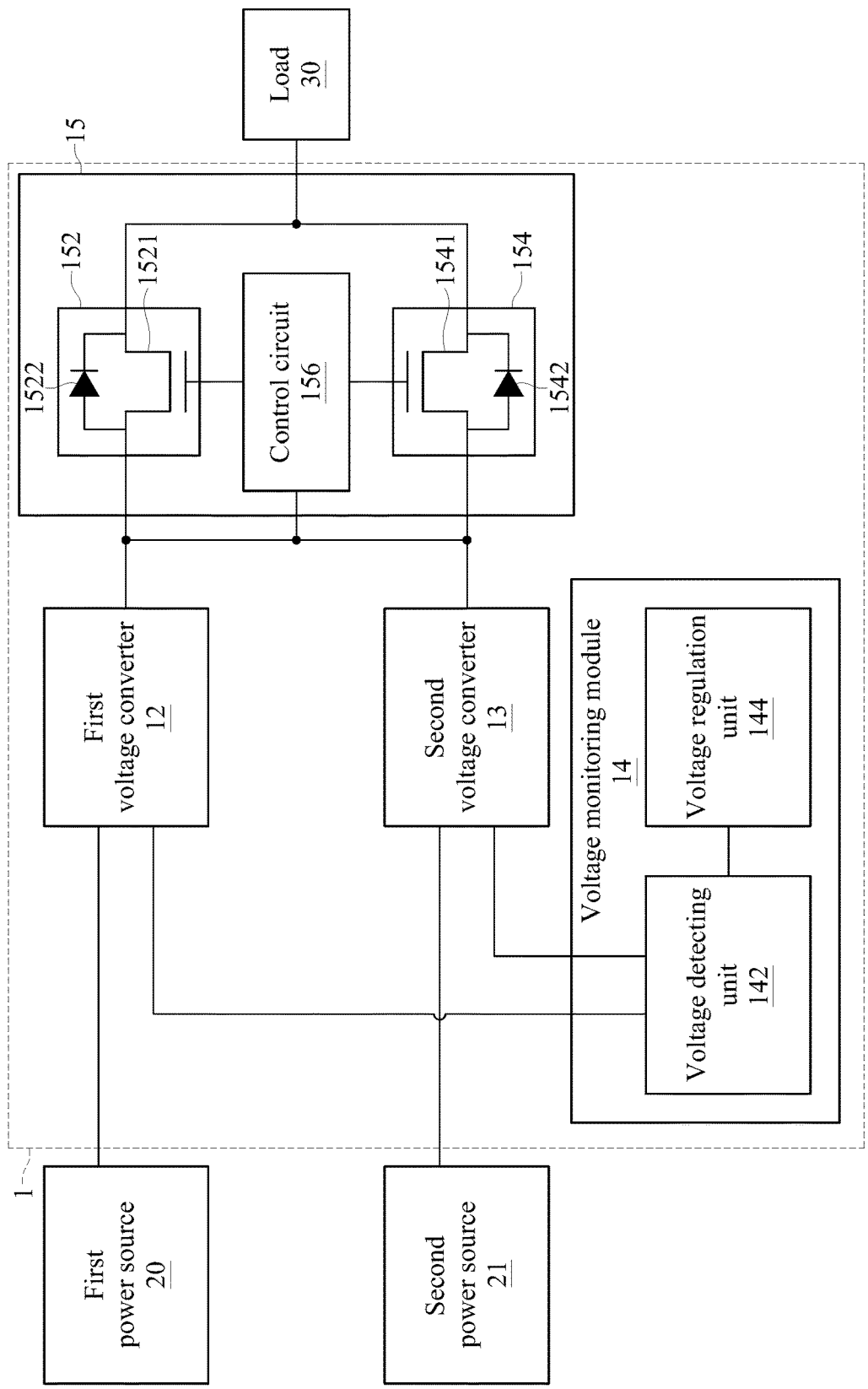

VOLTAGE CONTROL SYSTEM

CROSS-REFERENCE TO RELATED APPLICATIONS

This non-provisional application claims priority under 35 U.S.C. § 119(a) on Patent Application No(s). 105116765 filed in Taiwan, R.O.C. on May 27, 2016, the entire contents of which are hereby incorporated by reference.

TECHNICAL FIELD

The disclosure relates to a voltage control system, more particularly to a voltage control system for regulating a plurality of power sources.

BACKGROUND

Generally electrical devices operate through electrical energy supplied by power modules. Many electrical devices demand higher power, such as virtual reality devices or laptops. However, a single high power module could not be carried about because of rules in different districts. Therefore, a plurality of low power module and connected in parallel could be used as a single high power module to supply high power and could be carried about across districts. However, error values exist between the converted voltages of power modules when those power modules are connected in parallel to supply electrical energy. The error values cause the decrease of voltage conversion efficiency and the increase of the system temperature, and then the power modules' efficiency becomes poor.

SUMMARY

In an embodiment, the voltage control system includes a first voltage converter, a second voltage converter and a voltage monitoring module. The first voltage converter is coupled to a first power source and configured to convert first electrical energy of the first power source into a first output voltage. The second voltage converter is coupled to a second power source and configured to convert second electrical energy of the second power source into a second output voltage. The voltage monitoring module is coupled to the first voltage converter and the second voltage converter and configured to regulate the first output voltage or the second output voltage by controlling the first voltage converter and the second voltage converter according to the first output voltage and the second output voltage.

In an embodiment, the voltage monitoring module includes a voltage detecting unit a voltage regulation unit. The voltage regulation unit is coupled to the first voltage converter and the second voltage converter and configured to detect the first output voltage and the second output voltage and generate a detecting result. The voltage regulation unit is coupled to the voltage detecting unit and configured to regulate the first output voltage or the second output voltage by controlling the first voltage converter and the second voltage converter according to the first output voltage and the second output voltage.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein:

FIG. 1 is a block diagram of a voltage control system in an embodiment.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1. FIG. 1 is a block diagram of a voltage control system in an embodiment. As shown in FIG. 1, a voltage control system 1 includes a first voltage converter 12, a second voltage converter 13 and a voltage monitoring module 14. The first voltage converter 12 is coupled to a first power source 20 and configured to convert the first electrical energy of the first power source 20 into a first output voltage V1. The second voltage converter 13 is coupled to a second power source 21 and configured to convert the second electrical energy of the second power source 21 into a second output voltage V2. In an example, both the first power source 20 and the second power source 21 are power modules, such as batteries, adaptors, or power supplies, applied to electrical devices, and they can supply different electrical energy based on actual demand. In an example, the first voltage converter 12 and the second voltage converter 13 are coupled to a load 30 and respectively convert the first electrical energy and the second electrical energy to a constant voltage for the load 30. In one embodiment, the load 30 could be an electrical device such as a laptop. For example, assume the first voltage converter 12 and the second voltage converter 13 are applied to a laptop. The first voltage converter 12 and the second voltage converters 13 could respectively convert the electrical energy of a power module (eg. the first power source 20 or the second power source 21) to a constant voltage such as 12 volts, which is applied to a laptop for operation. However, the present disclosure is not limited to the above embodiment. In other embodiments, the power sources and the voltage converters are applied to other devices such as virtual reality devices or mobile devices. Note that in other examples, the voltage control system 1 could be coupled to a plurality of power sources, and the present disclosure is not limited to the number of power sources in above embodiment.

The voltage monitoring module 14 is electrically connected to the first voltage converter 12 and the second voltage converter 13. The voltage monitoring module 14 is configured to regulate the first output voltage V1 or the second output voltage V2 by controlling the first voltage converter 12 and the second voltage converter 13 according to the first output voltage V1 and the second output voltage V2. In an example, a way of regulating the first output voltage V1 or the second output voltage V2 is to adjust a feedback factor by regulating the resistance in a feedback circuit. In an embodiment, the voltage monitoring module 14 includes a voltage detecting unit 142 and a voltage regulation unit 144. The voltage detecting unit 142 is coupled to the first voltage converter 12 and the second voltage converter 13. The voltage detecting unit 142 is configured to detect the first output voltage V1 and the second output voltage V2 and then generate a detecting result. More specifically, the first electrical energy supplied by the first power source 10 and the second electrical energy supplied by the second power source 20 are respectively converted to the first output voltage V1 and the second output voltage V2 by the first voltage converter 12 and the second voltage converter 13. The voltage detecting unit 142 of the voltage monitoring module 14 can detect the value of the first output voltage V1 and the value of the second output voltage V2 to generate a detecting result.

The voltage regulation unit 144 is coupled to the voltage detecting unit 142. The voltage regulation unit 144 is configured to regulate the first output voltage V1 or the second output voltage V2 by controlling the first voltage converter 12 and the second voltage converter 13 according to the detecting result. In an example, ideally, the first output voltage V1 outputted by the first voltage converter 12 and the second output voltage V2 outputted by the second voltage converter 13 are the same. However, in practical, the first output voltage V1 outputted by the first voltage converter 12 and the second output voltage V2 outputted by the second voltage converter 13 are not the same. In other words, there is an error value between the first output voltage V1 and the second output voltage V2. For example, the voltage detecting unit 142 detects that the first output voltage V1 outputted the first voltage converter 12 is 17.3 volts and the second output voltage V2 outputted by the second voltage converter 13 is 17.1 volts. The voltage regulation unit 144 is configured to regulate the first output voltage V1 or the second output voltage V2 by controlling the first voltage converter 12 and the second voltage converter 13 according to the detecting result, so that the first output voltage regulated V1' and the second output voltage regulated V2' become the same or similar. For example, both the first output voltage V1 and the second output voltage V2 are exactly or approximately regulated to 17 volts.

In an embodiment, the detecting result generated by the voltage detecting unit 142 indicates that the first output voltage V1 is greater than the second output voltage V2 and a difference between the first output voltage V1 and the second output voltage V2 is greater than a first threshold. In response to the detecting result, the voltage regulation unit 144 decreases the first output voltage V1 or increases the second output voltage V2 so that a difference between the first regulated output voltage V1' and the second output voltage regulated V2' is less than the first threshold. In other words, in an embodiment, the voltage regulation unit 144 can decrease the first output voltage V1 so that the first output voltage regulated V1' is similar or equal to the second output voltage V2. In another embodiment, the voltage regulation unit 144 can increases the second output voltage V2 so that the second output voltage regulated V2' is similar or equal to the first output voltage V1. In other embodiments, the voltage regulation unit 144 decreases the first output voltage V1 and increases the second output voltage V2 so that the first output voltage regulated V1' and the second output voltage regulated V2' are similar or the same.

In a practical example, assume the first threshold is 0.1 volts, and the detecting result of the voltage detecting unit 142 indicates that the first output voltage V1 is 18.5 volts and the second output voltage V2 is 18.3 volts. The difference between the first output voltage V1 and the second output voltage V2 is 0.2 volts, which is greater than the first threshold. Accordingly, the voltage regulation unit 144 decreases the first output voltage V1 from 18.5 volts to 18.35 volts so that the difference between the first output voltage regulated V1' and the second output voltage V2 is 0.05 volts, which is less than the first threshold. In another embodiment, the voltage regulation unit 144 increases the second output voltage V2 from 18.3 volts to 18.45 volts so that the difference between the first output voltage V1 and the second output voltage regulated V2' is 0.05 volts, which is less than the first threshold.

In another practical example, assume the first threshold is 0.05 volts, and the detecting result of the voltage detecting unit 142 indicates that the first output voltage V1 is 16 volts and the second output voltage V2 is 16.1 volts. The difference between the first output voltage V1 and the second output voltage V2 is 0.1 volts, which is greater than the first threshold. At this time, the voltage regulation unit 144 increases the first output voltage V1 from 16 volts to 16.02 volts and decreases the second output voltage V2 from 16.1 volts to 16.05 volts. At this time, the difference between the first output voltage regulated V1' and the second output voltage regulated V2' is 0.03 volts, which is less than the first threshold. In another embodiment, the voltage regulation unit 144 regulates both the first output voltage V1 and the second output voltage V2 to 16.05 volts. At this time, there is no error value between the first output voltage regulated V1' and the second output voltage regulated V2'. As described above, based on the operation of the voltage control system 1, the first output voltage regulated V1' and the second output voltage regulated V2' are similar or the same so that unnecessary electrical energy loss can be reduced during the operation of the whole system to raise the system efficiency.

In an embodiment, the voltage control system 1 further includes a current balancing module 15. The current balancing module 15 includes a first current switch unit 152, a second current switch unit 154 and a control circuit 156. The first current switch unit 152 is coupled to the first voltage converter 12. The second current switch unit 154 is coupled to the second voltage converter 13. The control circuit 156 is coupled to the first current switch unit 152 and the second current switch unit 154. The control circuit 156 selectively turns on the first current switch unit 152 or the second current switch unit 154 according to a difference between the first output voltage regulated V1' and the second output voltage regulated V2' and a second threshold, and controls a first turn-on impedance of the first current switch unit 152 or a second turn-on impedance of the second current switch unit 154. Specifically, after the voltage monitoring module 14 regulates the first output voltage V1 and the second output voltage V2, the control circuit 156 compares the difference between the first output voltage regulated V1' and the second output voltage regulated V2' to the second threshold. Then the control circuit 156 turns on the first current switch unit 152 or the second current switch unit 154 according to the comparison result.

In an embodiment, the first current switch unit 152 includes a first transistor 1521 and a first diode 1522. The second current switch unit 154 includes a second transistor 1541 and a second diode 1542. The control circuit 156 selectively turns on the first transistor 1521 of the first current switch unit 152 or the second transistor 1541 of the second current switch unit 154 according to a difference between the first output voltage regulated V1' and the second output voltage regulated V2' and the second threshold. In other words, the control circuit 156 first obtains the first output voltage regulated V1' and the second output voltage regulated V2', and then compares the difference between them to the second threshold to determine to turn on the first transistor 1521 or the second transistor 1541. In an embodiment, when the first output voltage regulated V1' is greater than the second output voltage regulated V2' and the difference between the first output voltage regulated V1' and the second output voltage regulated V2' is greater than the second threshold, only the first power source 20 supplies electrical energy to the load end. The second current switch unit 154 is in off-state, and the second power source 21 does not supply electrical energy to the load end. In this embodiment, the second threshold is a forward bias of the first diode 1522. Positive and negative voltages can be respectively applied to the anode terminal of the first diode 1522 and the cathode terminal of the first diode 1522 to turn on the first diode 1522. At this time, the applied voltage is the forward bias of the first diode 1522.

In a practical example, assume the second threshold (the forward bias of the first diode 1522) is 0.5 volt. The first output voltage regulated V1' is 19 volt and the second output voltage regulated V2' is 18.4 volt. The control circuit 156 obtains the information indicating that the difference between the first output voltage regulated V1' and the second output voltage regulated V2' is 0.6 volt, which is greater than the second threshold. At this time, the first power source 20 supplies electrical energy to the load end, and the second transistor 1541 is in off-state in case the current flows back to the second current switch unit 154. Accordingly, from the perspective of view of the voltage control system 1, only the first power source 20 supplies electrical energy to the load end and the second power source 21 does not supply electrical energy to the load end so that the first output voltage regulated V1' and the second output voltage regulated V2' output from the current balancing module 15 become similar and then reach a voltage balance.

In another embodiment, the first output voltage regulated V1' is greater than the second output voltage regulated V2', and the difference between the first output voltage regulated V1' and the second output voltage regulated V2' is less than the second threshold. At this time, the control circuit 156 turns on both the first transistor 1521 of the first current switch unit 152 and the second transistor 1541 of the second current switch unit 154. The control circuit 156 makes the first output voltage regulated V1' and the second output voltage regulated V2' the same by controlling the first turn-on impedance of the first current switch unit 152 or the second turn-on impedance of the second current switch unit 154. For example, assume the second threshold (the forward bias of the first diode 1522) is 0.6 volt. The first output voltage regulated V1' is 19 volt and the second output voltage regulated V2' is 18.9 volt. The difference between the first output voltage regulated V1' and the second output voltage regulated V2' is 0.1 volt, which is less than the second threshold. At this time, both the first transistor 1521 of the first current switch unit 152 and the second transistor 1541 of the second current switch unit 154 are turned on. The control circuit 156 increases the first turn-on impedance of the first current switch unit 152 by decreasing the gate voltage of the first transistor 1521 so that the first output voltage regulated V1' and the second output voltage regulated V2' output from the current balancing module 15 become the same and then reach a voltage balance.

More electrical energy is consumed when the difference between the first output voltage V1 output from the first power source 20 and the second output voltage V2 output from the second power source 21 is more significant because the first power source 20 and the second power source 21 are connected in parallel for supplying electrical energy. Based on the setup of the voltage monitoring module 14, the first output voltage V1 and the second output voltage V2 could be regulated precisely so that the difference between them is less than the first threshold. For example, assume the difference between the first output voltage V1 and the second output voltage V2 is 0.5 volt and the output current is 1 amp. The power which the system will lose is 0.5 watt when the first power source 20 and the second power source 21 are connected in parallel for supplying electrical energy. Therefore, if the voltage monitoring module 14 makes the difference between the first output voltage V1 and the second output voltage V2 is less than the first threshold which is 0.2 volt, the electrical loss of the system will be within 0.2 watt.

Based on the description above, in the operation of the voltage control system 1, the voltage detecting unit 142 of the voltage monitoring module 14 detects the first output voltage V1 and the second output voltage V2, and the first output voltage V1 and the second output voltage V2 are regulated so that the first output voltage regulated V1' and the second output voltage regulated V2' are the same. Then the electrical loss caused during the system operation could be reduced and the conversion efficiency will increase.

What is claimed is:

1. A voltage control system, comprising:
   a first voltage converter coupled to a first power source and configured to convert first electrical energy of the first power source into a first output voltage;
   a second voltage converter coupled to a second power source and configured to convert second electrical energy of the second power source into a second output voltage; and
   a voltage monitoring module coupled to the first voltage converter and the second voltage converter and configured to regulate a level of the first output voltage or a level of the second output voltage by controlling the first voltage converter and the second voltage converter according to a difference between the first output voltage and the second output voltage.

2. The voltage control system according to claim 1, wherein the voltage monitoring module comprises:
   a voltage detecting unit coupled to the first voltage converter and the second voltage converter and configured to detect the first output voltage and the second output voltage and generate a detecting result; and
   a voltage regulation unit coupled to the voltage detecting unit and configured to regulate the first output voltage or the second output voltage by controlling the first voltage converter and the second voltage converter according to the detecting result.

3. The voltage control system according to claim 2, wherein the voltage regulation unit decreases the level of the first output voltage or increases the level of the second output voltage when the detecting result indicates that the first output voltage is greater than the second output voltage and the difference between the first output voltage and the second output voltage is greater than a first threshold.

4. The voltage control system according to claim 2, wherein when the detecting result indicates that the first output voltage is greater than the second output voltage and the difference between the first output voltage and the second output voltage is greater than a first threshold, the voltage regulation unit decreases the level of the first output voltage so that a difference between the first output voltage regulated and the second output voltage is less than the first threshold.

5. The voltage control system according to claim 2, wherein when the detecting result is that the first output voltage is greater than the second output voltage and the difference between the first output voltage and the second output voltage is greater than a first threshold, the voltage regulation unit decreases the level of the first output voltage and increases the level of the second output voltage so that a difference between the first output voltage regulated and the second output voltage regulated is less than the first threshold.

6. The voltage control system according to claim 1, further comprising:
   a current balancing module, comprising:
      a first current switch unit coupled to the first voltage converter;
      a second current switch unit coupled to the second voltage converter; and
      a control circuit coupled to the first current switch unit and the second current switch unit and configured to selectively turns on the first current switch unit or the second current switch unit according to a difference between the first output voltage regulated and the second output voltage regulated and a second threshold and control a first turn-on impedance of the first current switch unit or a second turn-on impedance of the second current switch unit.

7. The voltage control system according to claim 6, wherein the first current switch unit comprises a first transistor and a first diode, the second current switch unit comprises a second transistor and a second diode, the control circuit selectively turns on the first transistor of the first current switch unit or the second transistor of the second current switch unit according to the difference between the first output voltage regulated and the second output voltage regulated and the second threshold.

8. The voltage control system according to claim 7, wherein the control circuit turns on the first transistor of the first current switch unit when the first output voltage regulated is greater than the second output voltage regulated and the difference between the first output voltage regulated and the second output voltage regulated is greater than the second threshold.

9. The voltage control system according to claim 8, wherein the second threshold is a forward bias of the first diode.

* * * * *